US012756108B2

(12) United States Patent
Zhang et al.

(10) Patent No.: US 12,756,108 B2
(45) Date of Patent: Oct. 6, 2026

(54) DEVICE AND METHOD FOR CONTROLLING INTELLIGENT REFLECTING SURFACE ARRAY

(71) Applicant: SOUTH CHINA UNIVERSITY OF TECHNOLOGY, Guangzhou (CN)

(72) Inventors: Xiuyin Zhang, Guangzhou (CN); Huiping Yang, Guangzhou (CN); Xintu Zeng, Guangzhou (CN); Qunqiang Hu, Guangzhou (CN); Jie Tang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 254 days.

(21) Appl. No.: 18/725,153

(22) PCT Filed: Oct. 14, 2022

(86) PCT No.: PCT/CN2022/125461

§ 371 (c)(1),
(2) Date: Mar. 9, 2025

(87) PCT Pub. No.: WO2023/124399

PCT Pub. Date: Jul. 6, 2023

(65) Prior Publication Data

US 2026/0011927 A1 Jan. 8, 2026

(30) Foreign Application Priority Data

Dec. 28, 2021 (CN) ........................ 202111618675.9

(51) Int. Cl.
*H01Q 15/14* (2006.01)
*H01Q 3/38* (2006.01)
*H01Q 15/00* (2006.01)

(52) U.S. Cl.
CPC ................................ *H01Q 15/147* (2013.01)

(58) Field of Classification Search
CPC ....... H01Q 15/147; H01Q 3/38; H01Q 15/002
See application file for complete search history.

(56) References Cited

U.S. PATENT DOCUMENTS

2013/0107978 A1 5/2013 Thaller
2021/0359408 A1* 11/2021 Theofanopoulos ...... H01Q 3/36

FOREIGN PATENT DOCUMENTS

CN 102769291 11/2012
CN 108683408 A * 10/2018 .............. H03C 7/00
(Continued)

*Primary Examiner* — Hoang V Nguyen
(74) *Attorney, Agent, or Firm* — JMB Davis Ben-David

(57) ABSTRACT

Disclosed in the present invention is a device and method for controlling an intelligent reflecting surface array. The device comprises a control voltage module, a voltage amplification module and a varactor module which are connected in sequence; the varactor module is embedded in a subunit structure of the intelligent reflecting surface array; the control voltage module is used for generating a high-precision low-amplitude analog control voltage signal and inputting same into the voltage amplification module; the voltage amplification module is used for receiving the low-amplitude analog control voltage signal inputted by the control voltage module, and amplifying and inputting the low-amplitude analog control voltage signal into the varactor module; the varactor module is used for receiving a high-amplitude analog voltage signal inputted by the voltage amplification module to realize the regulation and control of a varactor output capacitance value. The present invention can realize the independent continuous controllability of each subunit of the intelligent reflecting surface array without using a DA chip, so that the manufacturing costs are remarkably reduced while ensuring high precision of communication channel management.

5 Claims, 3 Drawing Sheets

(56) References Cited

FOREIGN PATENT DOCUMENTS

| | | | | | |
|---|---|---|---|---|---|
| CN | 109067445 | | | 12/2018 | |
| CN | 111864399 | A | * | 10/2020 | ......... H01Q 15/0086 |
| CN | 112736483 | A | * | 4/2021 | ......... H01Q 15/0033 |
| CN | 212968072 | U | * | 4/2021 | |
| CN | 113206385 | | | 8/2021 | |
| CN | 113991306 | | | 1/2022 | |

* cited by examiner

DEVICE AND METHOD FOR CONTROLLING INTELLIGENT REFLECTING SURFACE ARRAY

CROSS-REFERENCE TO RELATED APPLICATIONS

This is the U.S. National Stage of International Patent Application No. PCT/CN2022/125461 filed Oct. 14, 2022, which in turn claims the benefit of Chinese Patent Application No. CN 202111618675.9 filed Dec. 28, 2021.

FIELD OF THE INVENTION

The present disclosure relates to a device and method for controlling an intelligent reflecting surface array in the field of next-generation mobile communication.

BACKGROUND OF THE INVENTION

Ultra-high and very high frequency (VHF) (millimeter wave, terahertz) communication are considered as potential technologies of the sixth-generation mobile communication system. The high operating frequency will enhance the reflectivity of the carrier signal and reduce diffraction, thereby affecting the signal coverage of mobile base stations. A feasible solution is to use intelligent reflecting surface to assist mobile communication, that is, by introducing intelligent reflecting surface array antennas between the base station transmitter and the receiver, enabling artificially dynamic control of the electromagnetic wave transmission channel, thereby significantly improving communication quality.

There are two common electrical control methods for the intelligent reflecting surface: PIN diode mode and varactor diode mode, which are specified as follows:

(1) PIN diode mode. PIN diodes are designed in subunits of the intelligent reflecting surface. By controlling the switching of the PIN diodes in each unit with electrical signals, the structure of the intelligent reflecting surface is changed to achieve artificial control of the electromagnetic wave transmission channel.

(2) Varactor diode mode. This mode is similar to the PIN diode mode, except that varactor diodes are embedded in the structure of the intelligent reflecting surface units. By controlling the voltage value of the two sides of the varactor diode, the aim of regulating the communication channel can be achieved.

SUMMARY OF THE INVENTION

Technical Problem

Since a PIN diode has only two states (on or off), the control state of the subunits of the intelligent reflecting surface and the number of embedded PIN diodes satisfies the $2^N$ relationship, where N denotes the number of integrated PIN diodes in the subunit. There are more the control states, the electromagnetic beamforming is more accurate, but the more PIN diodes need to be controlled in the subunits. Usually, one intelligent reflecting surface needs to be designed in hundreds of subunits. Therefore, the electrical control mode for the PIN diode is complex, and continuous adjustment of communication channels cannot be achieved.

The varactor diode mode can be continuously adjustable since it is controlled by an external analog voltage, but the analog control voltage of each subunit needs to be realized by integrating a set of digital-to-analog converter (DAC) chips. The manufacturing cost is high for the intelligent reflecting surface array which needs to be embedded into hundreds or thousands of subunits. Therefore, to simplify the control mode and reduce the manufacturing cost, the intelligent reflecting surface array is usually designed in a multiplex mode. Namely, all the subunits of a certain row or column in the intelligent reflecting surface share a path of PIN diode digital control signal or analog voltage value. While this mode can achieve channel management of the electromagnetic beam, its control power is significantly reduced.

Technical Solution

In view of the above, the present disclosure provides a device and method for controlling an intelligent reflecting surface array, which can realize the independent continuous controllability of each subunit of the intelligent reflecting surface array without DA chips, so that the manufacturing costs are remarkably reduced while ensuring high precision of communication channel management. Furthermore, the control device and method provided by the present disclosure are suitable for intelligent reflecting surface arrays and for similar application scenarios such as holographic antennas, reflectarray antennas, and meta-lens antennas array.

A first object of the present disclosure is to provide a device for controlling an intelligent reflecting surface array.

A second object of the present disclosure is to provide a method for controlling an intelligent reflecting surface array.

The first object of the present disclosure can be achieved by adopting the following technical solutions:

A device for controlling an intelligent reflecting surface array includes a control voltage module, a voltage amplification module, and a varactor diode module which are connected in sequence, where the varactor diode module is embedded in subunit structures of the intelligent reflecting surface array.

The control voltage module is configured to generate high-precision low-amplitude analog control voltage signals and input same into the voltage amplification module.

The voltage amplification module is configured to receive the low-amplitude analog control voltage signals input by the control voltage module, amplify the low-amplitude analog control voltage signals, and input same into the varactor diode module.

The varactor diode module is configured to receive high-amplitude analog voltage signals input by the voltage amplification module to realize regulation and control of capacitance values output by varactor diodes.

Further, the control voltage module includes a pulse width modulation (PWM) micro-control circuit and n-paths of resistor-capacitor (RC) filter integrating circuits; the PWM micro-control circuit is connected to the n-paths of RC filter integrating circuits via a serial-to-parallel converter, where the value of n is consistent with the number of the subunit structures of the intelligent reflecting surface array.

The PWM micro-control circuit is configured to output serial high-low level pulse digital signals with different duty ratios.

The RC filter integrating circuit is configured to convert pulse digital signals with different duty ratios in a predetermined time into high-precision analog voltage signals.

Further, the PWM micro-control circuit is realized in a programmable chip.

Further, the RC filter integrating circuit is composed of two groups of resistor and capacitor components in a cascade.

Further, the voltage amplification module includes n-paths of external power supply conditioning circuits and n-paths of voltage amplification circuits, where the n-paths of external power supply conditioning circuits are connected to the n-paths of voltage amplification circuits, respectively. The external power supply conditioning circuits are further connected to an external direct current voltage source, where the value of n is consistent with the number of the subunit structures of the intelligent reflecting surface array.

The external power supply conditioning circuits are configured to ensure that the voltage amplification circuits acquire stable power supply voltages.

The voltage amplification circuit is configured to amplify the low-amplitude analog control voltage signals input by the control voltage module and input the amplified high-amplitude analog voltage signals into the varactor diode module.

Further, the magnitudes of the power supply voltages of the voltage amplification circuits and multiples of the high-amplitude analog voltage signals are determined by a control voltage required by the varactor diode module.

The second object of the present disclosure can be achieved by adopting the following technical solutions:

A method for controlling an intelligent reflecting surface array includes: generating, by a control voltage module, high-precision low-amplitude analog control voltage signals and inputting same into a voltage amplification module; receiving, by the voltage amplification module, the low-amplitude analog control voltage signals input by the control voltage module, amplifying the low-amplitude analog control voltage signals, and inputting same into a varactor diode module; and receiving, by the varactor diode module, high-amplitude analog voltage signals input by the voltage amplification module to realize regulation and control of capacitance values output by varactor diodes.

Furthermore, the generating high-precision low-amplitude analog control voltage signals is specifically as follows: generating the high-low level pulse digital signals with different duty ratios through the PWM micro-control circuit and converting the pulse digital signals with different duty ratios into analog signals through the RC filter integrating circuits.

Furthermore, the amplifying the low-amplitude analog control voltage signals is specifically as follows: ensuring stable power supply voltages to be connected to voltage amplification circuits through external power supply conditioning circuits and amplifying the low-amplitude analog control voltage signals through the voltage amplification circuits.

Furthermore, the realizing regulation and control of capacitance values output by varactor diodes is specifically as follows: making the varactor diodes generate different capacitance values, and further making subunits of the intelligent reflecting surface to generate different resonance frequencies, to realize different phase compensation.

Beneficial Effects

The present disclosure has the following beneficial effects concerning the prior art:

1. The device and method for controlling an intelligent reflecting surface array provided by the present disclosure can realize continuous adjustment of the phase angles of electromagnetic beam radiation since the varactor diodes can be embedded in the subunit structures of the intelligent reflecting surface array.
2. The device and method for controlling an intelligent reflecting surface array provided by the present disclosure can significantly reduce manufacturing costs and significantly improve transmission channel control accuracy since the subunit structures of the intelligent reflecting surface array avoid the use of high-priced components such as analog-to-digital (AD)/digital-to-analog (DA) chips and can achieve individual control for each subunit.
3. The device and method for controlling an intelligent reflecting surface array provided by the present disclosure can perform artificially dynamic programming control on the transmission channels of electromagnetic waves since the control voltage module is realized by the PWM micro-control circuit.

BRIEF DESCRIPTION OF THE DRAWINGS

To explain the embodiments of the present disclosure or the technical solutions in the prior art more clearly, a brief description will be given below concerning the drawings used in the description of the embodiments or the prior art. It is obvious that the drawings in the description below are merely some embodiments of the present disclosure, and the ordinarily skilled in the art would have been able to obtain other drawings according to the structures shown in these drawings without involving any creative effort.

DETAILED DESCRIPTION OF THE EMBODIMENTS

To make the objects, technical solutions, and advantages of the embodiments of the present disclosure more apparent, the technical solutions in the embodiments of the present disclosure will be clearly and completely described below in conjunction with the drawings in the embodiments of the present disclosure. The described embodiments are only a part of the embodiments of the present disclosure, and not all the embodiments. Based on the embodiments in the present disclosure, all other embodiments obtained by the ordinarily skilled in the art without making creative labor fall within the scope of protection of the present disclosure.

Embodiment 1

Figure 1:
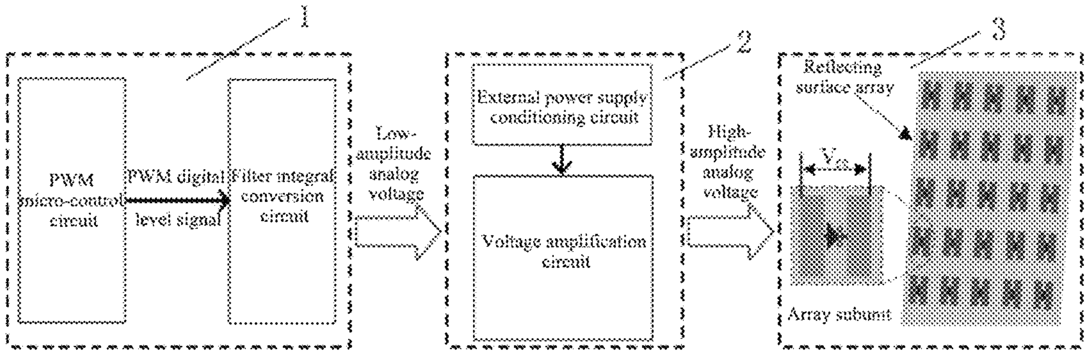
FIG. 1 is a structural block diagram of a device for controlling an intelligent reflecting surface array according to Embodiment 1 of the present disclosure.
Figure 2:
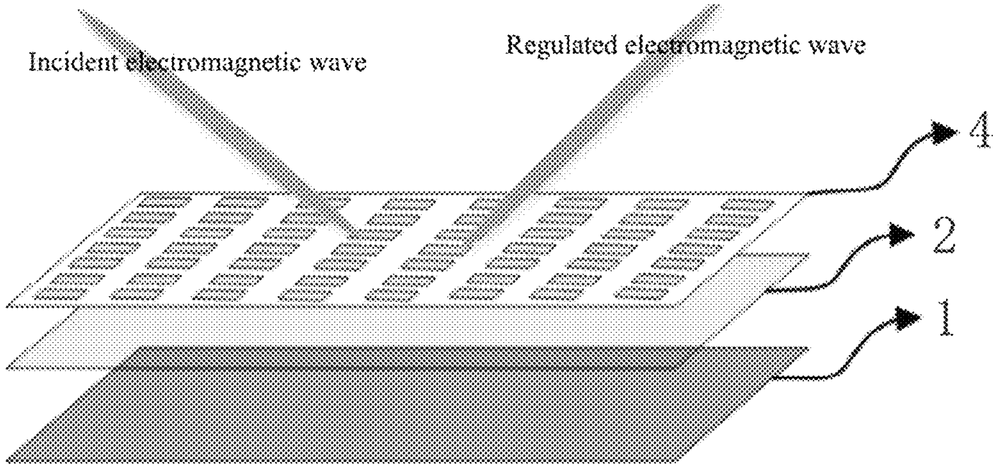
FIG. 2 is a structural diagram of a device for controlling an intelligent reflecting surface array according to Embodiment 1 of the present disclosure.

As shown in FIGS. 1 and 2, the embodiment provides a device for controlling an intelligent reflecting surface array, and the device includes a control voltage module 1, a voltage amplification module 2, and a varactor diode module 3; the control voltage module 1, the voltage amplification module 2, and the varactor diode module 3 are connected in sequence; the varactor diode module 3 is embedded in subunit structures of an intelligent reflecting surface array 4; by controlling the output voltage value of the voltage module 1, the varactor diode of the varactor diode module may generate different capacitance values, thereby enabling the subunit structures of the intelligent reflecting surface to generate different resonance frequencies, and realizing different phase compensation to achieve the purpose of artificially controlling the incident electromagnetic wave transmission channel; the number of subunit structures of the intelligent reflecting surface array 4 in the embodiment is 8*8-64; the intelligent reflecting surface array 4 directly manipulates the electromagnetic wave, and the specific method is that the compensation phases of each subunit of the array surface are different, then the regulated electromagnetic wave has different reflection directions and beamforming, where the beamforming and manipulation are realized by the control voltage module 1 and the voltage amplification module 2 cooperating to control the varactor diodes embedded in the subunit structures of the intelligent reflecting surface array 4.

Figure 3:
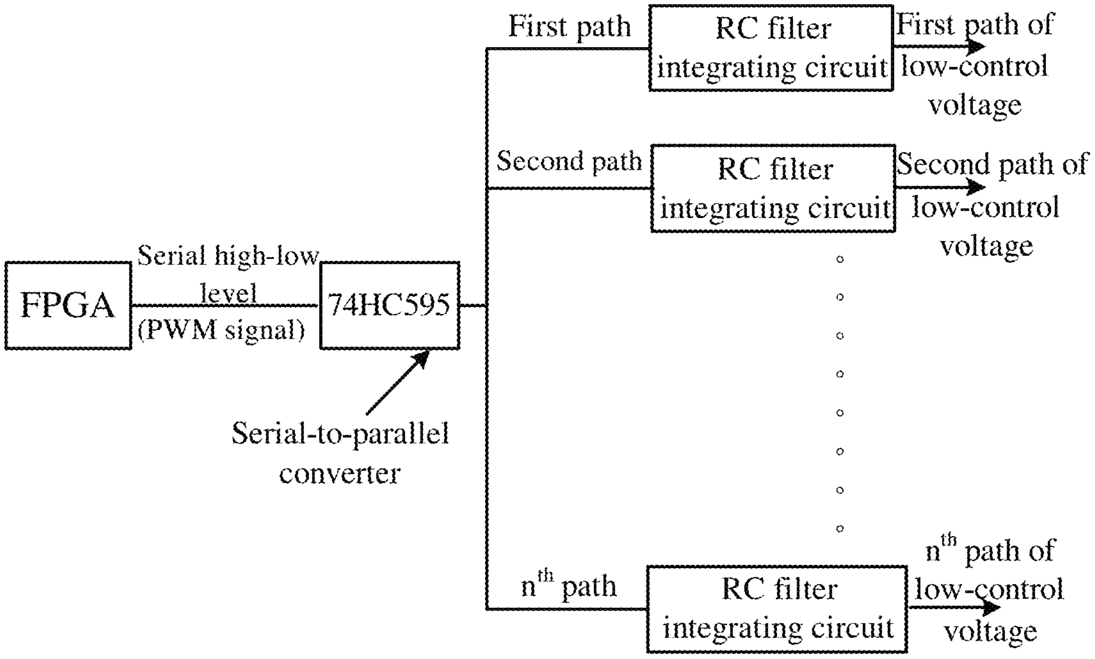
FIG. 3 is a structural block diagram of a control voltage module in a device for controlling an intelligent reflecting surface array according to Embodiment 1 of the present disclosure.
Figure 4:
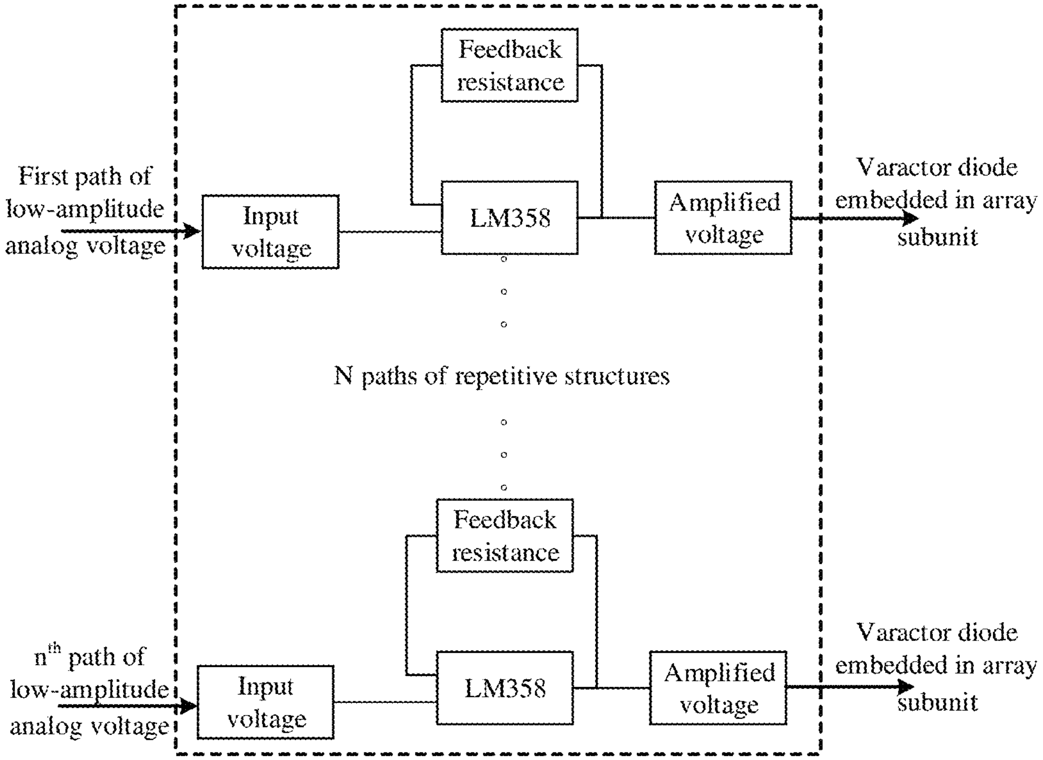
FIG. 4 is a structural block diagram of a voltage amplification module in a device for controlling an intelligent reflecting surface array according to Embodiment 1 of the present disclosure.

Specifically, the control voltage module 1 is configured to generate high-precision low-amplitude analog control voltage signals and input the same to the voltage amplification module 2. Furthermore, as shown in FIGS. 1 to 3, the control voltage module 1 internally includes a PWM micro-control circuit and n-paths of RC filter integrating circuits, where the PWM micro-control circuit is implemented in a programmable chip, such as a field-programmable gate array (FPGA) and a single chip microcomputer. The FPGA programmable chip is selected in the embodiment, specifically Xilinx XC7A35T type and the output thereof is serial high-low level pulse digital signals with different duty ratios; the FPGA programmable chip is connected to the n-paths of RC filter integrating circuits via serial-to-parallel converter, and the value of n is consistent with the number of subunit structures of the intelligent reflecting surface array. Since there are 64 subunit structures of the intelligent reflecting surface array 4 in the embodiment, there are n=64 paths of RC filter integrating circuits, and the serial-to-parallel converter model in the embodiment is 74HC595; the PWM wave (essentially high-low level serial signals) output by the FPGA programmable chip is converted to each path of RC integral filter circuit through serial-parallel conversion, because the number of high-low levels contained in each path is different, then the amplitude of the low-control voltage generated after the RC filter integral circuit is also different (being an analog voltage); each path of RC filter integral circuit is composed of two groups of resistor and capacitor components in a cascade, and the function thereof is to convert pulse digital signals with different duty ratios in a predetermined time (for example, 1 ms) into the high-precision analog voltage signals, for example, a serial high-low level pulse digital signal with a duty ratio of 80%, then the corresponding generated low-amplitude analog control voltage signal is 3.3*0.8=2.64 V.

Specifically, the voltage amplification module 2 is configured to receive the low-amplitude analog control voltage signals input by the control voltage module 1, amplify the low-amplitude analog control voltage signals, and input the same to the varactor diode module 3. Furthermore, as shown in FIGS. 1 to 4, the voltage amplification module 2 includes n-paths of external power supply conditioning circuits and n-paths of voltage amplification circuits, where the n-paths of external power supply conditioning circuits are connected to the n-paths of voltage amplification circuits, respectively, and likewise, the value of n is consistent with the number of subunit structures of the intelligent reflecting surface array, n=64; the external power supply conditioning circuits are further connected to an external direct current voltage source, mainly serving for stabilizing voltage to ensure that stable power supply voltages are connected to the voltage amplification circuits; and input signals of the voltage amplification circuits are high-precision low-amplitude analog voltage signals generated by the control voltage module. The voltage amplification circuit inputs the amplified high-amplitude analog voltage signals to the varactor diode module 3, where magnitudes of the power supply voltages of the voltage amplification circuits and multiples of the high-amplitude analog voltage signals are determined by a control voltage required by the varactor diode module. The voltage amplification circuit of the embodiment directly selects an LM358 operational amplifier component, the amplification multiple thereof being adjustable between 1 to 100 times, and the power supply voltage being required to be 3 to 30 V.

Specifically, the varactor diode module 3 is configured to receive the high-amplitude analog voltage signals input by the voltage amplification module 2, to realize the regulation and control of the capacitance values output by the varactor diodes; since the varactor diode module 3 is embedded in the subunit structures of the intelligent reflecting surface array 4, the varactor diodes in the varactor diode module 3 are a key for the transmission channel management of the intelligent reflecting surface array 4; to realize beamforming, different array subunits generally need to compensate for different phases, namely, different resonant frequencies are required for different array subunits, so by controlling voltages Vee at two sides of each varactor diode, the capacitance values thereof is dynamically adjusted to change the resonance frequencies of the subunits of the reflecting surface, and then different resonance frequencies are generated to realize different phase compensation angles to realize channel management and beamforming of incident electromagnetic waves.

The embodiment further provides a method for controlling an intelligent reflecting surface array, which is realized based on the above device for controlling an intelligent reflecting surface array, including the following steps:

At S1, the control voltage module generates high-precision low-amplitude analog control voltage signals and inputs same into the voltage amplification module.

The generating high-precision low-amplitude analog control voltage signals is specifically as follows: generating the high-low level pulse digital signals with different duty ratios through the PWM micro-control circuit, and converting the pulse digital signals with different duty ratios into analog signals through the RC filter integrating circuits.

At S2, the voltage amplification module receives the low-amplitude analog control voltage signals input by the control voltage module, amplifies the low-amplitude analog control voltage signals, and inputs same into the varactor diode module.

The amplifying the low-amplitude analog control voltage signals is specifically as follows: ensuring stable power supply voltages to be connected to voltage amplification circuits through external power supply conditioning circuits, and amplifying the low-amplitude analog control voltage signals through the voltage amplification circuits.

At S3, the varactor diode module receives high-amplitude analog voltage signals input by the voltage amplification module to realize regulation and control of capacitance values output by varactor diodes.

The realizing regulation and control of capacitance values output by varactor diodes is specifically as follows: making the varactor diodes generate different capacitance values, and further making subunits of the intelligent reflecting surface to generate different resonance frequencies, to realize different phase compensation.

Embodiment 2

Figure 5:
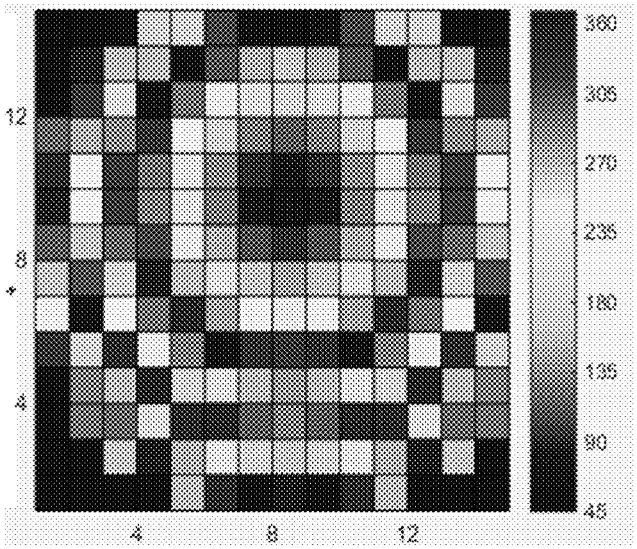
FIG. 5 is a phase compensation distribution map of a specific formed beam (vertical deflection) 30° according to Embodiment 2 of the present disclosure.

In certain application scenarios, it is necessary to deflect the electromagnetic wave transmission channel perpendicularly incident on the intelligent reflecting surface array by 30° along the perpendicular line in reverse direction. According to the theory of electromagnetic wave transmission, the phase compensation diagram of each subunit may be calculated as in FIG. 5, then the specific capacitance values required by each subunit may be solved according to the phase compensation diagram, and then the voltage values required by each subunit may be solved according to the corresponding relationship between the capacitance of a specific varactor diode (selected as Skyworks SMV1405 type in the embodiment) and the voltage.

Concerning a voltage value of a certain specific subunit of the intelligent reflection array, for example, 26 V, the PWM micro-control circuit of the control voltage module generates a serial digital pulse high-low levels corresponding to a duty ratio, where 26 V corresponds to the duty ratio of the PWM digital signal being 79%; then, the RC filter integral conversion circuit converts the PWM digital signal into an analog low-voltage signal, and since the operating low voltage of the control voltage module is 3.3 V, the digital signal with a duty ratio of 79% corresponds to a low-amplitude analog voltage of $3.3*0.79\approx2.60$ V.

Figure 6:
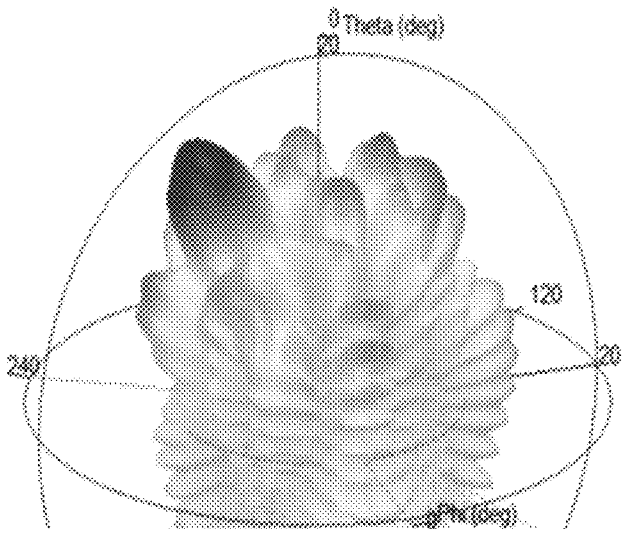
FIG. 6 is a vertical reverse deflection 30° beamforming map according to Embodiment 2 of the present disclosure.

The external voltage source generates stable power supply voltages through the external power supply conditioning circuit in the voltage amplification module to drive the operational amplifier device LM358 to work and amplify the low-amplitude analog voltage of the control voltage module. In the embodiment, the low-amplitude analog voltage is 2.6 V, and the expected voltage value of 26 V may be obtained by amplifying the low-amplitude analog voltage by a factor of 10. The 30° beamforming of the designed intelligent reflecting surface array is shown in FIG. 6.

In summary, the present disclosure converts the compensation phases of the channel manipulation of the subunits of the intelligent reflecting surface array into the voltage values of the varactor diodes. Since the voltage values of the varactor diodes are continuously controllable, the subunits may perform continuous phase compensation, in other words, the reflecting surface array may perform continuous communication channel control; at the same time, since the control voltages are essentially PWM digital level signals with different duty ratios that may be changed in programmable, the formed beam of the reflecting surface array may be modulated dynamically and in programmable. Furthermore, since each subunit of the reflecting surface array may be controlled, the reflecting surface array may ensure high-precision beamforming; furthermore, the use of the AD/DA chips is avoided in generating the varactor diode control voltage, which greatly reduces the manufacturing and production costs of the intelligent reflecting surface array.

Although the above description of the specific implementations of the present disclosure is described to facilitate the skilled in the prior art to understand the present disclosure, it should be clear that the present disclosure is not limited to the scope of the implementations. For the ordinarily skilled in the prior art, as long as various changes are within the spirit and scope of the present disclosure defined and determined by the attached claims, these changes are obvious, and all inventions using concepts of the present disclosure are protected.

The invention claimed is:

1. A device for controlling an intelligent reflecting surface array, comprising a control voltage module, a voltage amplification module, and a varactor diode module which are connected in sequence, wherein the varactor diode module is embedded in subunit structures of the intelligent reflecting surface array;

the control voltage module is configured to generate high-precision low-amplitude analog control voltage signals and input same into the voltage amplification module;

the voltage amplification module is configured to receive the low-amplitude analog control voltage signals input by the control voltage module, amplify the low-amplitude analog control voltage signals, and input same into the varactor diode module;

the varactor diode module is configured to receive high-amplitude analog voltage signals input by the voltage amplification module to realize regulation and control of capacitance values output by varactor diodes;

the control voltage module comprises a pulse width modulation (PWM) micro-control circuit and n-paths of resistor-capacitor (RC) filter integrating circuits; the PWM micro-control circuit is connected to the n-paths of RC filter integrating circuits via a serial-to-parallel converter; the PWM micro-control circuit is realized in a programmable chip; the RC filter integrating circuit is composed of two groups of resistor and capacitor components in a cascade, wherein the value of n is consistent with the number of subunit structures of the intelligent reflecting surface array;

the PWM micro-control circuit is configured to output serial high-low level pulse digital signals with different duty ratios;

the RC filter integrating circuit is configured to convert pulse digital signals with different duty ratios in a predetermined time into the high-precision low-amplitude analog control voltage signals and input same into voltage amplification circuits of the voltage amplification module;

the intelligent reflecting surface array directly manipulates an electromagnetic wave, and a specific method is that compensation phases of subunit structures of the array surface are different, then the regulated electromagnetic wave has different reflection directions and beamforming, wherein the beamforming and manipulation are realized by the control voltage module and the voltage amplification module cooperating to control the varactor diodes embedded in the subunit structures of the intelligent reflecting surface array; the different subunit structures of the intelligent reflecting surface array need different resonance frequencies, and by controlling voltages at two sides of each varactor diode, the capacitance value of the varactor diode is dynamically adjusted to change the resonance frequency of the subunit structure of the intelligent reflecting surface array, and then different resonance frequencies are generated to realize different phase compensation angles to realize channel management and beamforming of incident electromagnetic waves;

the voltage amplification module comprises n-paths of external power supply conditioning circuits and n-paths of voltage amplification circuits, wherein the n-paths of external power supply conditioning circuits are connected to the n-paths of voltage amplification circuits, respectively; the external power supply conditioning circuits are further connected to an external direct current voltage source, wherein the value of n is consistent with the number of the subunit structures of the intelligent reflecting surface array;

the external power supply conditioning circuits are configured to ensure that the voltage amplification circuits acquire stable power supply voltages;

the voltage amplification circuit is configured to amplify the low-amplitude analog control voltage signals input by the control voltage module, and input the amplified high-amplitude analog voltage signals into the varactor diode module; magnitudes of the power supply voltages of the voltage amplification circuits and multiples of the high-amplitude analog voltage signals are determined by a control voltage required by the varactor diode module.

2. A method for controlling an intelligent reflecting surface array, realized based on the device for controlling an intelligent reflecting surface array according to claim 1, wherein the method comprises: generating, by a control voltage module, high-precision low-amplitude analog control voltage signals and inputting same into a voltage amplification module; receiving, by the voltage amplification module, the low-amplitude analog control voltage signals input by the control voltage module, amplifying the low-amplitude analog control voltage signals, and inputting same into a varactor diode module; and receiving, by the varactor diode module, high-amplitude analog voltage signals input by the voltage amplification module to realize regulation and control of capacitance values output by varactor diodes.

3. The method for controlling an intelligent reflecting surface array according to claim 2, wherein the generating high-precision low-amplitude analog control voltage signals is specifically as follows: generating the high-low level pulse digital signals with different duty ratios through the PWM micro-control circuit, and converting the pulse digital signals with different duty ratios into analog signals through the RC filter integrating circuits.

4. The method for controlling an intelligent reflecting surface array according to claim 2, wherein the amplifying the low-amplitude analog control voltage signals is specifically as follows: ensuring stable power supply voltages to be connected to voltage amplification circuits through external power supply conditioning circuits, and amplifying the low-amplitude analog control voltage signals through the voltage amplification circuits.

5. The method for controlling an intelligent reflecting surface array according to claim 2, wherein the realizing regulation and control of capacitance values output by varactor diodes is specifically as follows: making the varactor diodes generate different capacitance values, and further making subunits of the intelligent reflecting surface to generate different resonance frequencies, to realize different phase compensation.

* * * * *